United States Patent
Oikawa et al.

(10) Patent No.: US 10,377,148 B2
(45) Date of Patent: Aug. 13, 2019

(54) FUNCTION EXECUTING METHOD OF DEVICE, DEVICE, AND PROGRAM

(71) Applicant: SEIKO EPSON CORPORATION, Tokyo (JP)

(72) Inventors: Hideki Oikawa, Shiojiri (JP); Seiji Tanaka, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/758,668

(22) PCT Filed: Sep. 12, 2016

(86) PCT No.: PCT/JP2016/004138
§ 371 (c)(1),
(2) Date: Mar. 8, 2018

(87) PCT Pub. No.: WO2017/047067
PCT Pub. Date: Mar. 23, 2017

(65) Prior Publication Data
US 2018/0304646 A1    Oct. 25, 2018

(30) Foreign Application Priority Data
Sep. 14, 2015   (JP) ................. 2015-180777

(51) Int. Cl.
*H04N 1/04*   (2006.01)
*B41J 3/407*  (2006.01)
(Continued)

(52) U.S. Cl.
CPC .............. *B41J 3/4075* (2013.01); *B41J 3/46* (2013.01); *G06F 3/0482* (2013.01);
(Continued)

(58) Field of Classification Search
CPC ... G06F 3/0488; G06F 3/04847; G06F 3/0482
(Continued)

(56) References Cited

U.S. PATENT DOCUMENTS

2013/0208306 A1* 8/2013 Fukasawa ............. G06F 3/1205
                                                        358/1.15
2014/0022568 A1* 1/2014 Nakaya .................... B65C 9/46
                                                        358/1.6
(Continued)

FOREIGN PATENT DOCUMENTS

| JP | 2010-185994 A | 8/2010 |
| JP | 2009-253946 A | 11/2014 |
| JP | 2014-215961 A | 11/2014 |

OTHER PUBLICATIONS

International Search Report issued in related International Patent Application No. PCT/JP2016/004138, dated Oct. 11, 2016.

*Primary Examiner* — Houshang Safaipour
(74) *Attorney, Agent, or Firm* — Foley & Lardner LLP

(57) ABSTRACT

A function executing method of a device that executes a step of displaying an operation unit image, which is an image of an operation unit of an apparatus including the operation unit and an apparatus function executing unit that executes a function by an operation of the operation unit, by a device display unit, a step of detecting an operation of the operation unit image by a detection unit, and a step of executing the function based on detection of the operation of the operation unit image by a device function executing unit.

3 Claims, 16 Drawing Sheets

(51) Int. Cl.
    *G06F 3/0488*     (2013.01)
    *G06F 3/0484*     (2013.01)
    *H04Q 9/00*     (2006.01)
    *G06F 3/0482*     (2013.01)
    *B41J 3/46*     (2006.01)
    *G08C 17/02*     (2006.01)

(52) U.S. Cl.
    CPC .......... *G06F 3/0484* (2013.01); *G06F 3/0488* (2013.01); *G06F 3/04847* (2013.01); *G06F 3/04886* (2013.01); *G08C 17/02* (2013.01); *H04Q 9/00* (2013.01)

(58) Field of Classification Search
    USPC ........................................................ 358/1.18
    See application file for complete search history.

(56) References Cited

U.S. PATENT DOCUMENTS

2014/0063542 A1*   3/2014   Aoki .................... G06F 3/1296
                                                         358/1.15
2014/0320912 A1   10/2014   Kubo et al.
2016/0070510 A1*   3/2016   Iwase .................... G06F 3/1222
                                                         358/1.14

* cited by examiner

FUNCTION EXECUTING METHOD OF DEVICE, DEVICE, AND PROGRAM

TECHNICAL FIELD

The present invention relates to a function executing method of a device executing a function by an operation from a user, a device, and a program.

BACKGROUND ART

In the related art, a water heater including a remote control device and a control target device that executes a kettle function by an operation of the remote control device is known (refer to PTL 1).

CITATION LIST

Patent Literature

PTL 1: Japanese Unexamined Patent Application Publication No. 2009-253946

SUMMARY OF INVENTION

Technical Problem

The present inventor has found out the following problems.

Instead of an apparatus including an operation unit and an apparatus function executing unit that executes a function by an operation of the operation unit, it is conceivable to execute the same function by operating a device that is different from the apparatus is considered. However, in a case where the operability of the device is different from the operability of the operation unit of the apparatus, it is inconvenient for a user who is familiar with using the operation unit of the apparatus since the device cannot be operated as the user likes.

An object of the invention is to provide a function executing method of a device, in which a user operates the device with the same usability as an operation unit of an apparatus and a function can be executed, the device, and a program.

Solution to Problem

According to the invention, there is provided a function executing method of a device that executes a step of displaying an operation unit image, which is an image of an operation unit of an apparatus including the operation unit and an apparatus function executing unit which executes a function by an operation of the operation unit, by a device display unit, a step of detecting an operation of the operation unit image by a detection unit, and a step of executing the function based on detection of the operation of the operation unit image by a device function executing unit.

According to the invention, there is provided a device including a device display unit that displays an operation unit image, which is an image of an operation unit of an apparatus having the operation unit and an apparatus function executing unit that executes a function by an operation of the operation unit, a detection unit that detects an operation of the operation unit image; and a device function executing unit that executes the function based on detection of the operation of the operation unit image.

According to the invention, there is provided a program causing a computer to execute each step in the function executing method of a device.

In this configuration, a user can perform an operation of the operation unit image displayed on the device display unit as in the case of performing an operation of the operation unit. The device function executing unit can execute the function based on detection of the operation of the operation unit image. Therefore, according to the configuration, a user operates the device with the same usability as the operation unit of the apparatus and the function can be executed.

In the function executing method of a device, it is preferable that the apparatus have a plurality of models each of which has a different specification of the operation unit, the device further execute a step of displaying the plurality of models such that the models can be selected and selecting one model, out of the plurality of models, by the device display unit, and in the step of displaying the operation unit image, the device display unit display an image of the operation unit of the selected model as the operation unit image.

In this configuration, a user can select a desired model from the plurality of models. Therefore, according to the configuration, a user can operate the device with the same usability as the operation unit of the desired model.

In this case, it is preferable that the operation unit have a letter input unit that receives an operation of inputting a letter, the apparatus function executing unit create print data, as the function, based on the letter input by an operation of the letter input unit, the apparatus further have a printing unit that performs printing based on the print data, in the step of displaying the operation unit image, a letter input unit image, which is an image of the letter input unit and receives the operation of inputting a letter, be included in the operation unit image displayed by the device display unit, and in the step of executing the function, the device function executing unit create the print data, as the function, based on the letter input by an operation of the letter input unit image.

In this configuration, a user can perform an operation of the letter input unit image displayed on the device display unit as in the case of performing an operation of the letter input unit. Then, the device function executing unit creates print data based on a letter input by the operation of the letter input unit image. Therefore, according to the configuration, a user operates the device with the same usability as the letter input unit of the apparatus and can create print data.

In this case, it is preferable that the apparatus further have an apparatus display unit that displays the letter input by the operation of the letter input unit and the device further execute a step of displaying a display unit image, which is an image of the apparatus display unit and in which the letter input by the operation of the letter input unit image is displayed, by the device display unit.

According to this configuration, a user can operate the device while the user checks a letter input by an operation of the letter input unit image.

In this case, it is preferable that the device further execute a step of transmitting the print data created in the step of executing the function to the apparatus that performs printing based on the received print data or to another apparatus that performs printing based on the received print data without having the function of creating the print data, by a data transmission unit.

According to this configuration, even in a case where the apparatus is not at hand, printing can be performed by the apparatus or another apparatus by a user operating the device with the same usability as the letter input unit of the apparatus.

DESCRIPTION OF EMBODIMENTS

Hereinafter, a terminal device E, which is an embodiment of a device according to the invention, and a tape printing apparatus, which can execute printing based on print data created by the terminal device E, will be described with reference to the accompanying drawings. There are a tape printing apparatus (hereinafter, referred to as a "first printing apparatus 100") that includes an operation panel 101 and a tape printing apparatus (hereinafter, referred to as a "second printing apparatus 200") that does not include the operation panel 101 as tape printing apparatuses.

Figure 1:
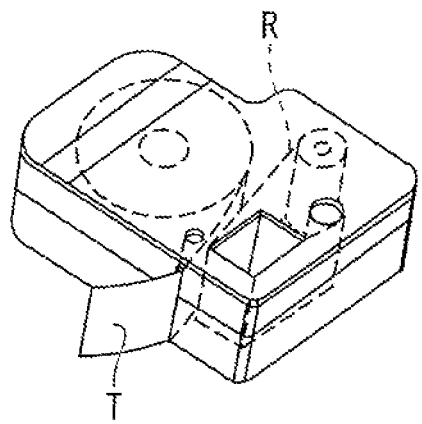
FIG. 1 is an external view of a tape printing apparatus (first printing apparatus), which is a tape printing apparatus that can execute printing based on print data created by a terminal device according to an embodiment of the invention and includes an operation panel.
Figure 1:
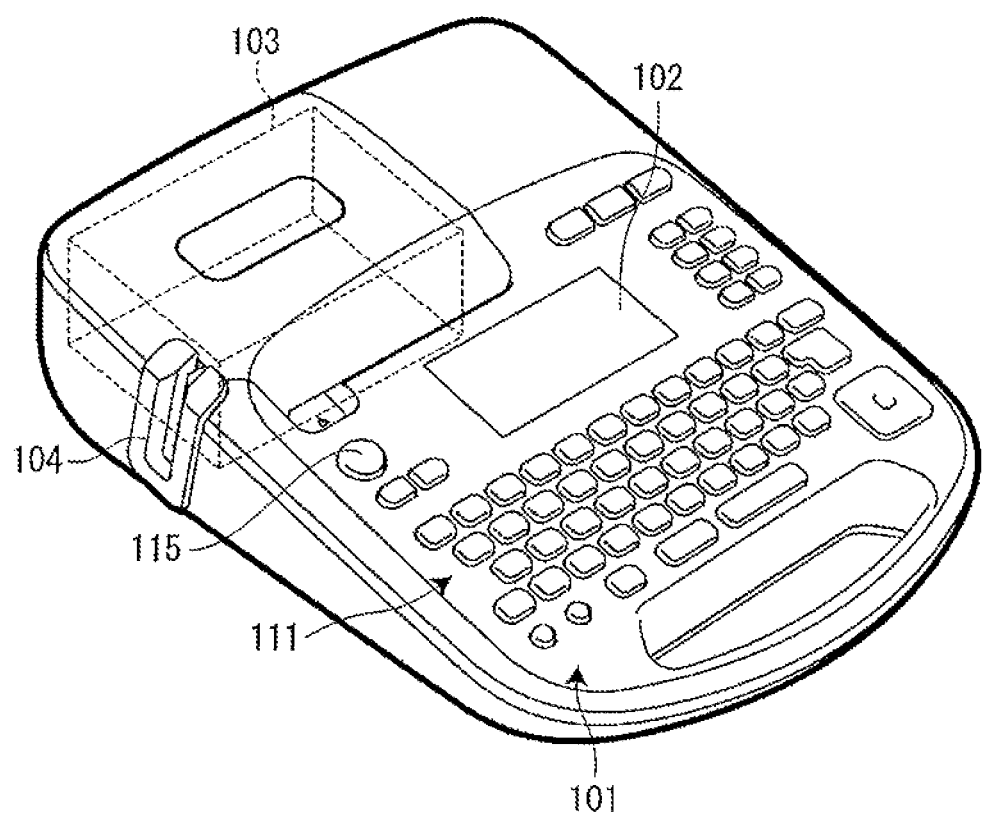

The first printing apparatus 100 will be described with reference to FIG. 1. The first printing apparatus 100 executes printing based on print data created by itself or print data received from the terminal device E. The first printing apparatus 100 includes the operation panel 101, an apparatus display 102, a cartridge mounting portion 103, and a tape outlet 104.

The operation panel 101 receives various types of operations from a user. A letter key group 111 and a print key 115 are provided on the operation panel 101. The letter key group 111 includes a plurality of keys, and each key receives an operation of inputting each letter such as an alphabet. Letters include numbers and symbols. The print key 115 receives an operation of instructing printing execution.

Figure 2:
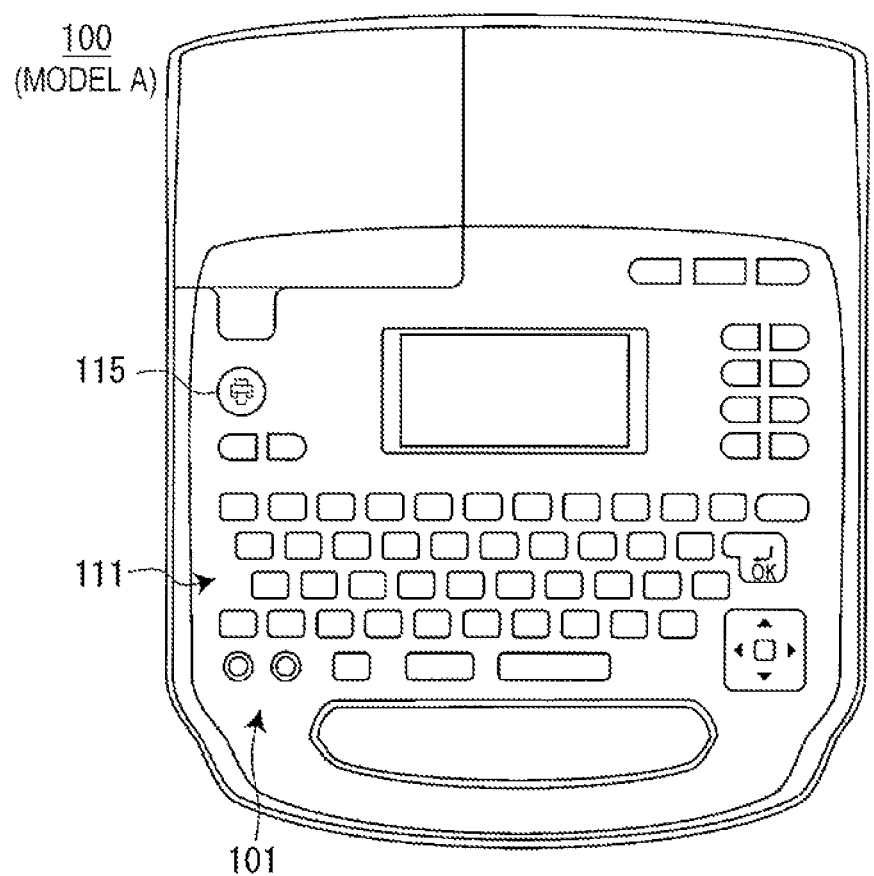
FIG. 2 is a view illustrating a model A of the first printing apparatus.

Herein, the first printing apparatus 100 includes a plurality of models each of which has a different specification of the operation panel 101, that is, arrangement of keys configuring the operation panel 101. For example, when a model (hereinafter, referred to as a "model A") illustrated in FIG. 2 is compared with a model (hereinafter, referred to as a "model B") illustrated in FIG. 3, arrangement of keys is different in that the print key 115 is provided on the inner left of the letter key group 111 in the model A while the print key is provided on the inner right of the letter key group 111 in the model B.

Referring back to FIG. 1, the apparatus display 102 performs predetermined display by an operation of each key of the operation panel 101. For example, the apparatus display 102 displays a letter input by an operation of the letter key group 111. A tape cartridge C is detachably mounted on the cartridge mounting portion 103. The tape cartridge C includes tape T and an ink ribbon R. A print head (not illustrated) is provided on the cartridge mounting portion 103. The print head performs thermal printing onto the tape T in the tape cartridge C that is mounted on the cartridge mounting portion 103.

The tape outlet 104 is at a place where the mounted tape cartridge C is reeled out and the tape T on which printing is performed is sent out. A cutter (not illustrated) is provided between the cartridge mounting portion 103 and the tape outlet 104. The cutter cuts the tape T in a width direction. Consequently, a portion of the tape T on which printing is completed is cut out.

Figure 4:
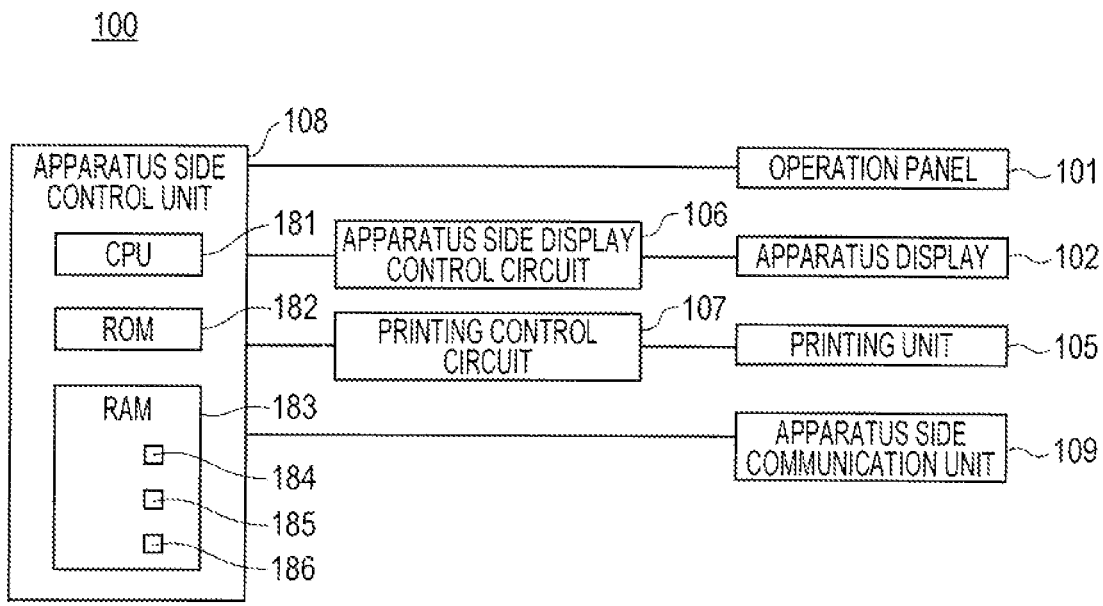
FIG. 4 is a block diagram showing a configuration of the first printing apparatus.

A configuration of the first printing apparatus 100 will be described with reference to FIG. 4. The first printing apparatus 100 includes the operation panel 101, the apparatus display 102, a printing unit 105, an apparatus side display control circuit 106, a printing control circuit 107, an apparatus side communication unit 109, and an apparatus side control unit 108.

The printing unit 105 includes a motor for driving the cutter and a motor, which is a driving source for sending the tape T and the ink ribbon R, in addition to the print head and the cutter described above. The apparatus side display control circuit 106 controls the apparatus display 102 based on a control signal from the apparatus side control unit 108. The printing control circuit 107 controls each configuration element of the printing unit 105 based on a control signal from the apparatus side control unit 108. The apparatus side communication unit 109 performs wireless communication with the terminal device E. For example, a wireless local area network (LAN) and Bluetooth (registered trademark) can be used as a wireless communication system.

The apparatus side control unit 108 includes a central processing unit (CPU) 181, a read only memory (ROM) 182, and a random access memory (RAM) 183, and comprehensively controls the entire first printing apparatus 100.

The CPU 181 reads programs stored in the ROM 182, and executes various types of arithmetic processing using the RAM 183.

A display control program, a print data creation program, a printing control program, and a transmission and reception control program are stored in the ROM 182. The display control program is a program for controlling the apparatus display 102 so as to correspond to a code data of a letter input by an operation of the operation panel 101. The print data creation program is a program for creating print data (herein, dot pattern data) provided for printing with respect to a letter stored in a text memory 184 (to be described later) in the RAM 183. The printing control program is a program for performing printing by outputting dot pattern data for each dot row in turn to the print head and a sending motor of the printing unit 105. The transmission and reception control program is a program for controlling transmission and reception of data to and from the terminal device E.

In addition to a memory in which calculation results from the CPU 181 are temporarily stored, the text memory 184, a printing buffer 185 and a reception buffer 186 are provided in the RAM 183. Text data formed of code data of a letter input from the letter key group 111 of the operation panel 101 is stored in the text memory 184. Dot pattern data corresponding to text data stored in the text memory 184 is developed and stored in the printing buffer 185. Data received from the terminal device E is stored in the reception buffer 186. Dot pattern data is included in the data which is transmitted from the terminal device E and is stored in the reception buffer 186.

Figure 5:
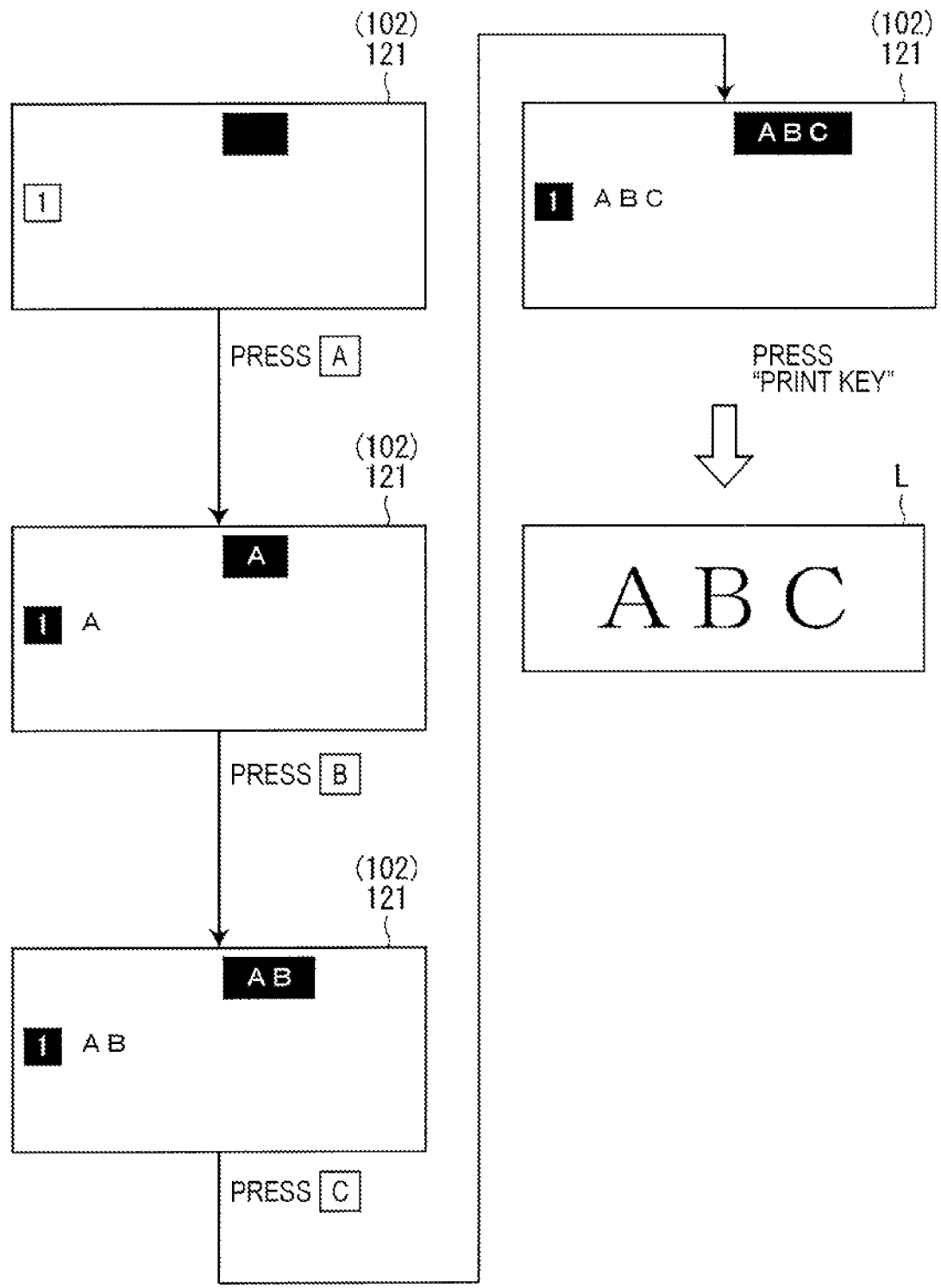
FIG. 5 is a view illustrating screen transition when the tape printing apparatus is operated to create a label, and a printed label.

Operation procedures when the first printing apparatus 100 is operated to create a label L will be described with reference to FIG. 5. When power is supplied, the apparatus display 102 displays an input edition screen 121 after displaying an initial screen. Next, when an "A" key in the letter key group 111 is pressed, "A" is displayed onto the input edition screen 121. A print image based on an input letter is displayed on the upper right of the input edition screen 121. Next, when a "B" key in the letter key group 111 is pressed, "AB" is displayed onto the input edition screen 121. When a "C" key in the letter key group 111 is pressed, "ABC" is displayed onto the input edition screen 121. Then, when the print key 115 is pressed, the apparatus side control unit 108 creates print data based on the letters input by the operations of the letter key group 111. The printing unit 105 performs automatic cutting after printing is performed on the tape T based on the created print data. Consequently, the label L on which a character string "ABC" is printed is created.

Figure 6:
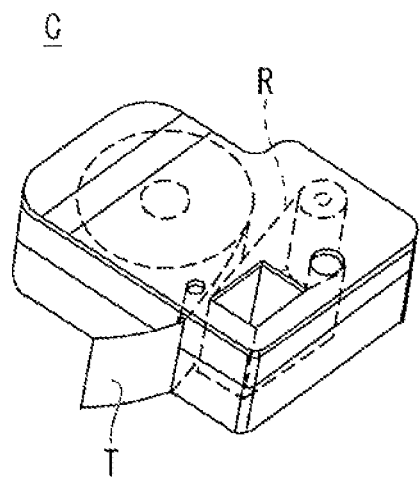
FIG. 6 is an external view of a tape printing apparatus (second printing apparatus), which is a tape printing apparatus that can execute printing based on the print data created by the terminal device and does not include the operation panel.
Figure 6:
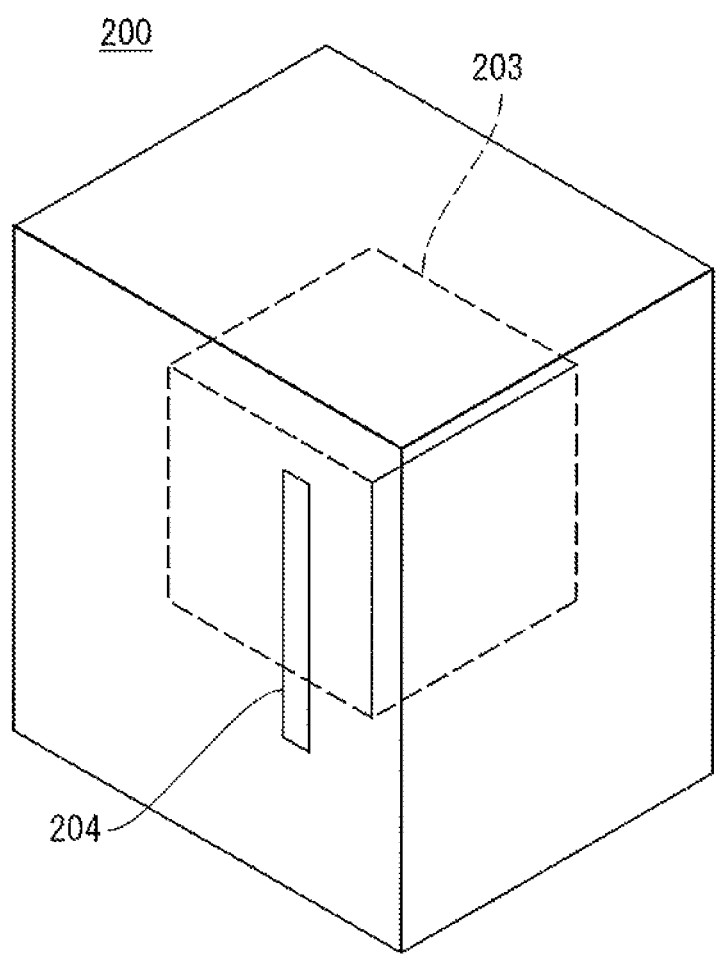

The second printing apparatus 200 will be described with reference to FIG. 6. The second printing apparatus 200 executes printing based on print data received from the terminal device E. The second printing apparatus 200 includes a cartridge mounting portion 203 and a tape outlet 204. The second printing apparatus 200 has substantially the same configuration as the first printing apparatus 100 except that the operation panel 101 and the apparatus display 102 are not included.

Figure 7:
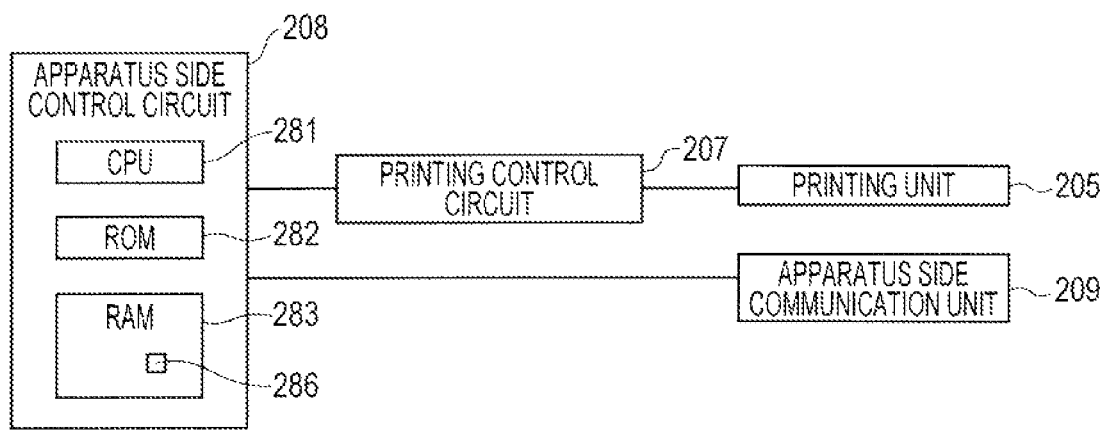
FIG. 7 is a block diagram showing a configuration of the second printing apparatus.

A configuration of the second printing apparatus 200 will be described with reference to FIG. 7. The second printing apparatus 200 includes a printing unit 205, a printing control circuit 207, an apparatus side communication unit 209, and an apparatus side control unit 208. The printing unit 205, the printing control circuit 207, and the apparatus side communication unit 209 of the second printing apparatus 200 have substantially the same configuration as the printing unit 105, the printing control circuit 107, and the apparatus side communication unit 109 of the first printing apparatus 100, respectively.

The apparatus side control unit 208 includes a CPU 281, a ROM 282, and a RAM 283 and comprehensively controls the entire second printing apparatus 200.

The CPU 281 reads programs stored in the ROM 282, and executes various types of arithmetic processing using the RAM 283. A printing control program and a transmission and reception control program are stored in the ROM 282. The printing control program and the transmission and reception control program have substantially the same configuration as the printing control program and the transmission and reception control program stored in the ROM 182 of the first printing apparatus 100, respectively. In addition to a memory in which calculation results from the CPU 281 are temporarily stored, a reception buffer 286 is provided in the RAM 283. The reception buffer 286 functions substantially the same as the reception buffer 186 provided in the RAM 183 of the first printing apparatus 100.

Figure 8:
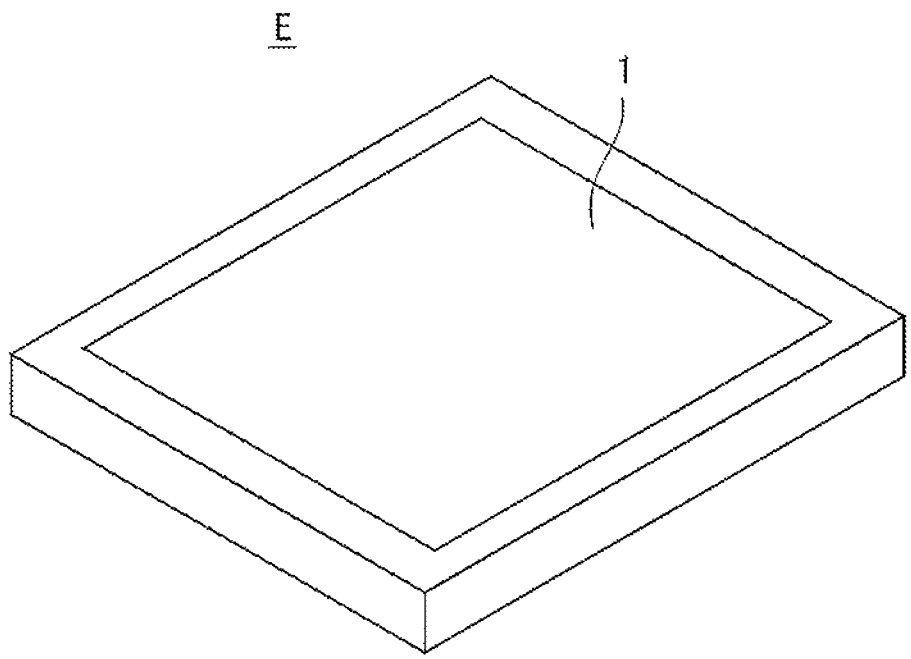
FIG. 8 is an external view of the terminal device.

The terminal device E will be described with reference to FIG. 8. The terminal device creates print data to be transmitted to the first printing apparatus 100 or the second printing apparatus 200. The terminal device E is, for example, a tablet terminal, a smartphone, or a PC. The terminal device E includes a touch panel 1. The touch panel 1 displays various types of screens, and receives an operation such as a tap by a user.

Figure 9:
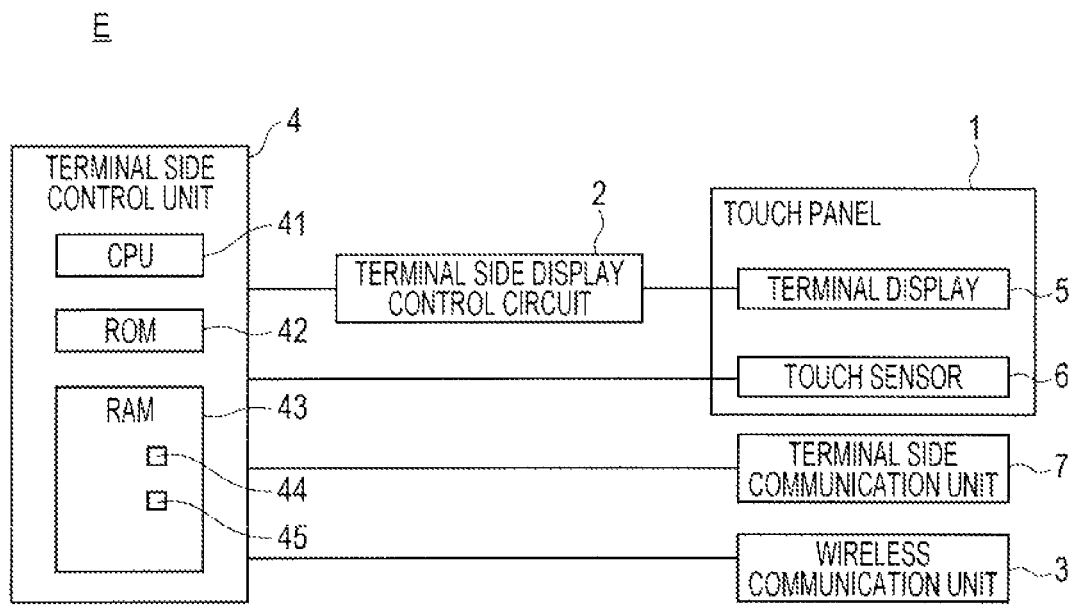
FIG. 9 is a block diagram showing a configuration of the terminal device.

A configuration of the terminal device E will be described with reference to FIG. 9. The terminal device E includes the touch panel 1, a terminal side display control circuit 2, a terminal side communication unit 7, a wireless communication unit 3, and a terminal side control unit 4.

The touch panel 1 includes a terminal display 5 and a touch sensor 6. The terminal display 5 displays various types of screens. The touch sensor 6 detects a place where an operation such as a tap is performed in the screen of the terminal display 5. The terminal side display control circuit 2 controls the terminal display 5 based on a control signal from the terminal side control unit 4.

The terminal side communication unit 7 performs wireless communication with the first printing apparatus 100 or the second printing apparatus 200. The wireless communication unit 3 is connected to a communication network via a mobile communication network or a wireless LAN access point and performs wireless communication between servers.

The terminal side control unit 4 includes a CPU 41, a ROM 42, and a RAM 43 and comprehensively controls the entire terminal device E.

The CPU 41 reads programs stored in the ROM 42, and executes various types of arithmetic processing using the RAM 43.

A display control program and a transmission and reception control program are stored in the ROM 42. The display control program is a program for controlling the terminal display 5 based on results obtained by the touch sensor 6 detecting an operation such as a tap on the terminal display 5. The transmission and reception control program is a program for controlling transmission and reception of data to and from the first printing apparatus 100 or the second printing apparatus 200.

An application software for creating print data to be supplied to the first printing apparatus 100 or the second printing apparatus 200 (hereinafter, referred to as a "print data creation app") is also stored in the ROM 42. The print data creation app is downloaded, for example, from a predetermined server (website) via the wireless communication unit 3 and is installed in the ROM 42.

In addition to a memory in which calculation results from the CPU 41 are temporarily stored, a text memory 44 and a supply data memory 45 are provided in the RAM 43. Text data formed of code data of a letter input by an operation of the terminal display 5 is stored in the text memory 44. Print data to be supplied to the first printing apparatus 100 or the second printing apparatus 200 is stored in the supply data memory 45.

Figure 10:
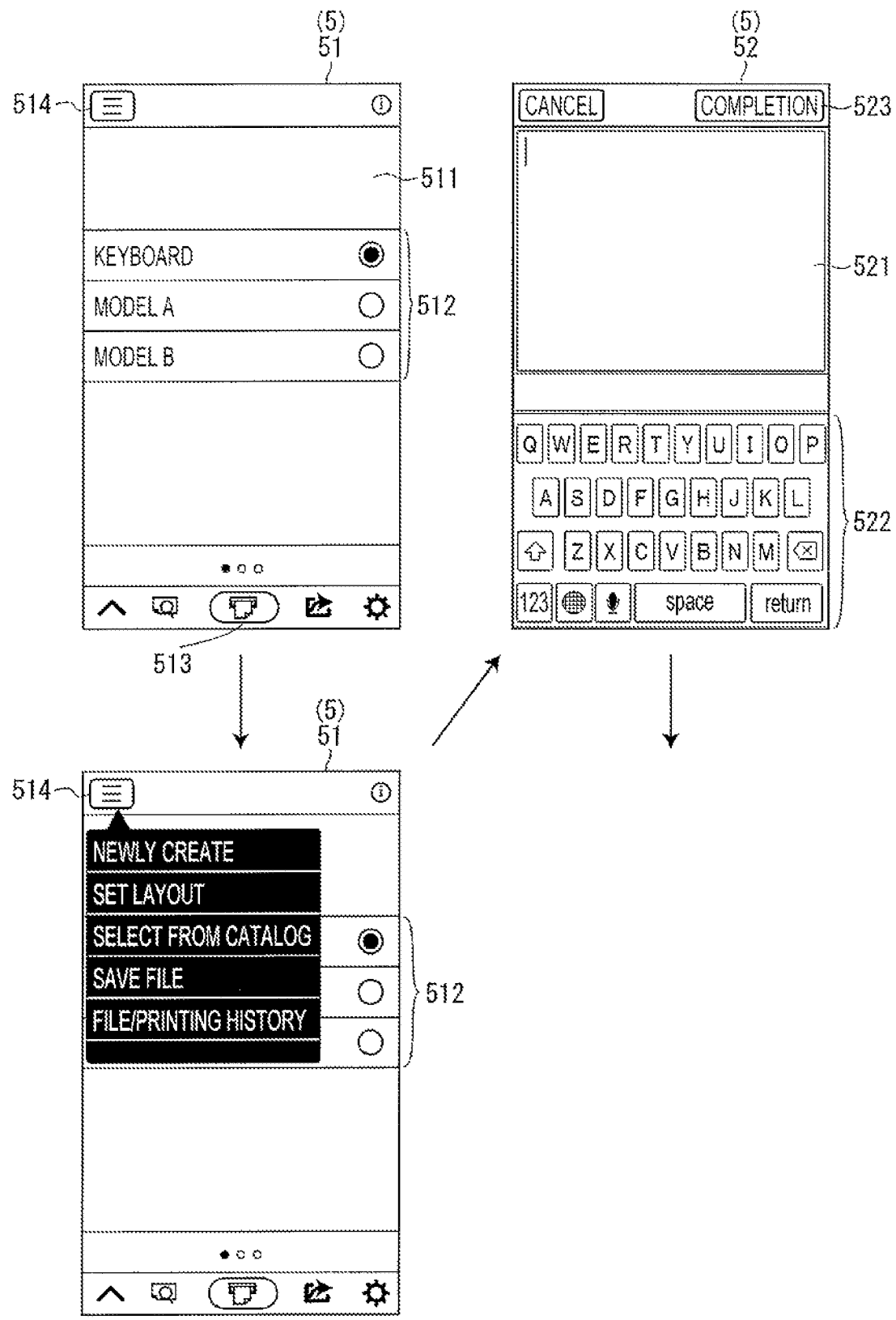
FIG. 10 is a screen transition view when the terminal device, in which a software keyboard is selected as a user interface, is operated to create the label.

Operation procedures in a case where the terminal device E, in which a software keyboard 522 is selected as a user interface, is operated to create the label L will be described with reference to FIG. 10 to FIG. 13. When the print data creation app is started in the terminal device E, the terminal display 5 displays a main screen 51 as illustrated in FIG. 10. A print image display field 511, an interface selection field 512, a print icon 513, and a menu icon 514 are displayed onto the main screen 51.

A print image is displayed onto the print image display field 511. The print image is an image created based on a letter input by an operation of the software keyboard 522 to be described later.

User interfaces to be used in the print data creation app are displayed in the interface selection field 512 such that interfaces can be selected. The "keyboard", the "model A", and the "model B" are displayed as choices of the user interface. Herein, "keyboard" is selected as default.

The print icon 513 receives an operation of instructing printing execution. The menu icon 514 receives an operation for calling up choices in a menu.

When the menu icon 514 is tapped, options such as "new setting" are displayed onto the main screen 51 such that the menus can be selected. When a "new setting" option is tapped from the plurality of options of menus in a state where the "keyboard" is selected in the interface selection field 512, a keyboard input screen 52 is displayed. A case where the "model A" or the "model B" is selected in the interface selection field 512 will be described later.

An input letter display field 521, the software keyboard 522, and a completion button 523 are displayed onto the keyboard input screen 52. A letter input by an operation of the software keyboard 522 is displayed in the input letter display field 521. The software keyboard 522 receives an operation of inputting each letter such as an alphabet. The completion button 523 receives an operation for returning to the main screen 51 after completion of the operation of inputting a letter.

Figure 11:
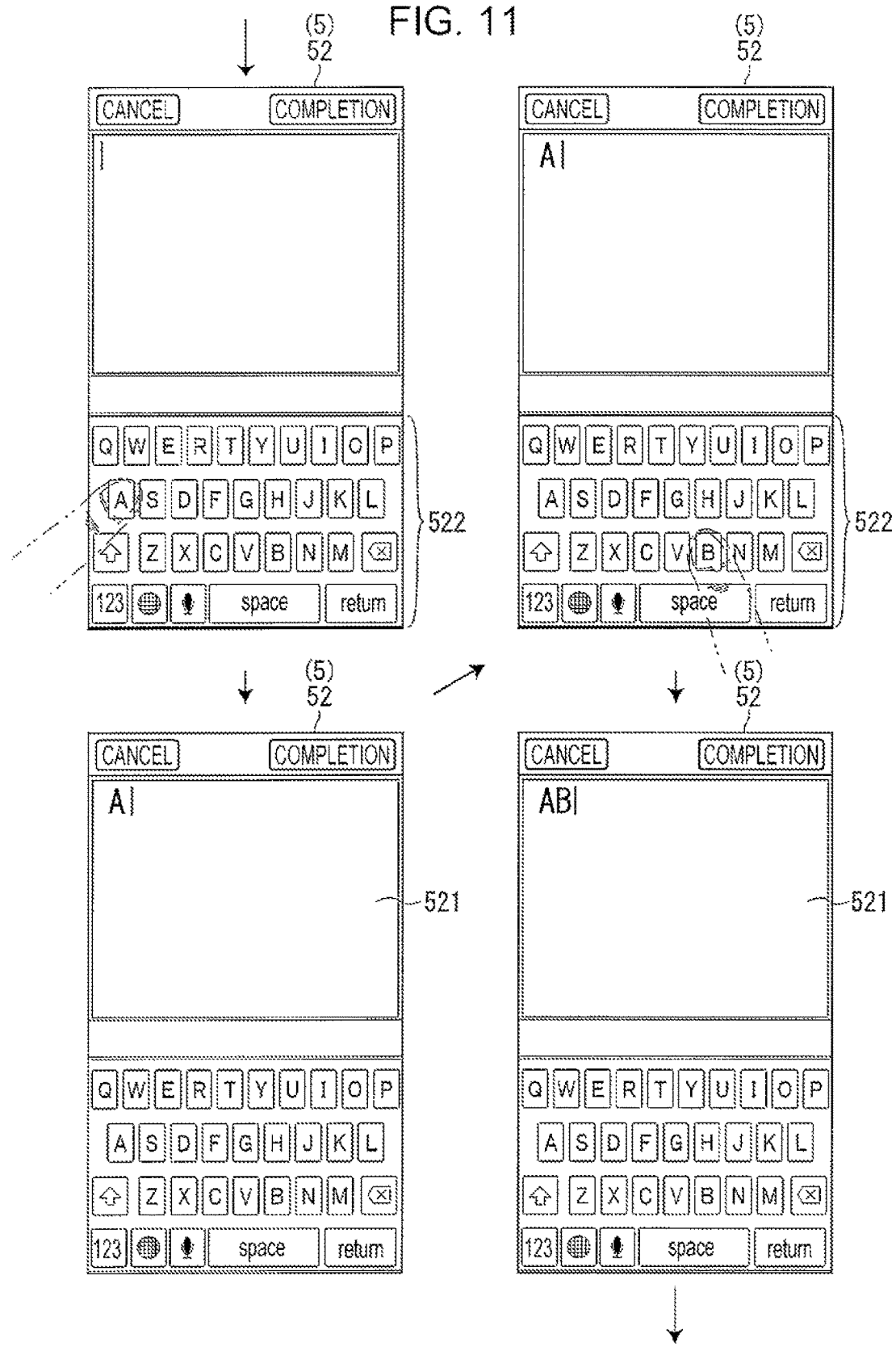
FIG. 11 is a screen transition view following FIG. 10.

As illustrated in FIG. 11, for example, when the "A" key is tapped from the software keyboard 522 on the keyboard input screen 52, "A" is displayed in the input letter display field 521. Next, when the "B" key is tapped from the software keyboard 522, "AB" is displayed in the input letter display field 521. Next, as illustrated in FIG. 12, when the "C" key is tapped from the software keyboard 522, "ABC" is displayed in the input letter display field 521.

Figure 12:
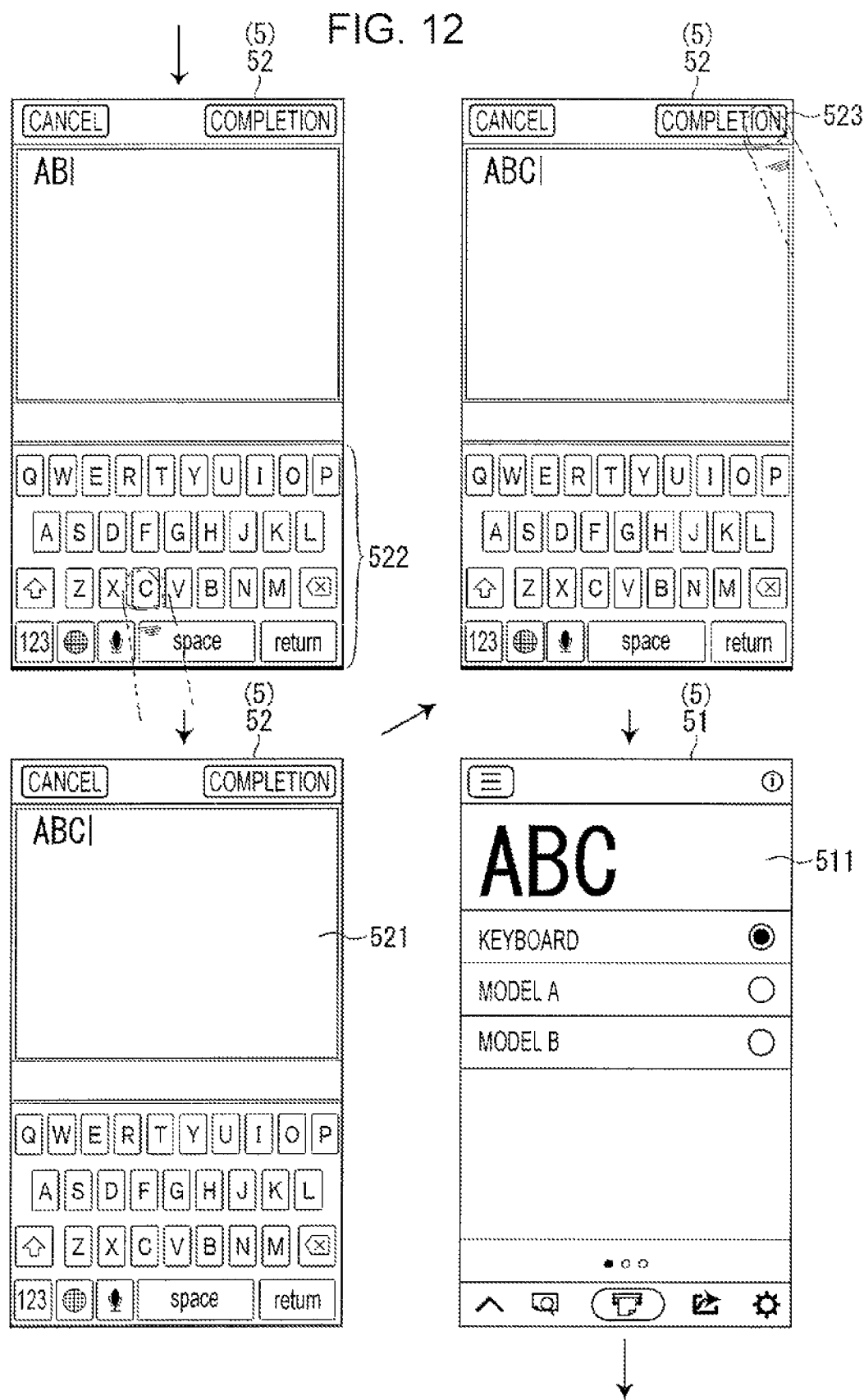
FIG. 12 is a screen transition view following FIG. 11.

Next, as illustrated in FIG. 12, when the completion button 523 is tapped and the main screen 51 returns, a print image based on the letters input by the operations of the software keyboard 522 on the keyboard input screen 52 is displayed in the print image display field 511.

Figure 13:
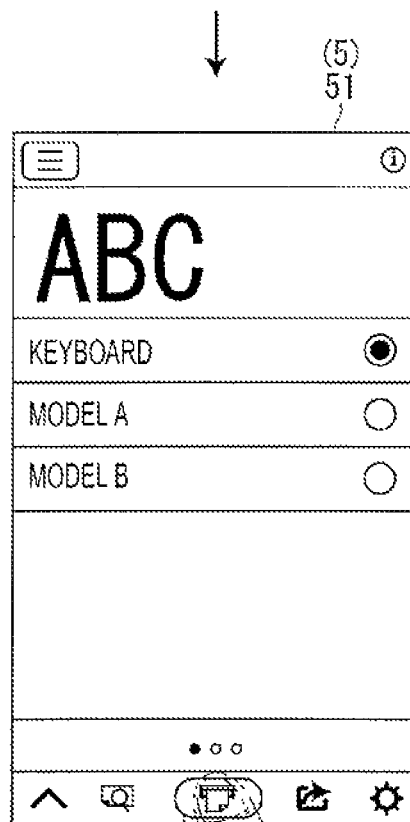
FIG. 13 is a view illustrating screen transition following FIG. 12 and the label printed by the second printing apparatus.
Figure 13:
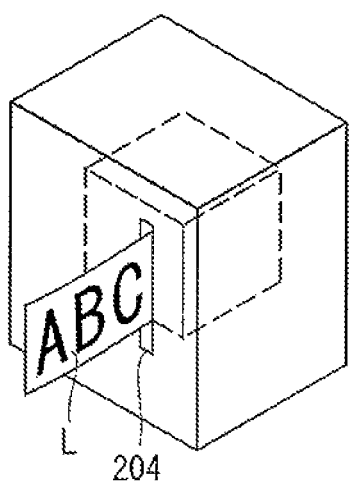

Then, as illustrated in FIG. 13, when the print icon 513 is tapped, the terminal side control unit 4 creates print data based on the letters input by the operations of the software keyboard 522, and the terminal side communication unit 7 transmits the created print data to the second printing apparatus 200. The second printing apparatus 200 performs automatic cutting after printing is performed on the tape T based on the received print data. Consequently, the label L on which a character string "ABC" is printed is sent out from the tape outlet 204 of the second printing apparatus 200. Although the created print data is supplied to the second printing apparatus 200 herein, the same description made above applies to a case where the print data is supplied to the first printing apparatus 100.

As described above, in a case where the terminal device E, in which the software keyboard 522 is selected as a user interface, is operated to create the label L, on which the character string "ABC" is printed, a user taps the "A" key, the "B" key, the "C" key, and the completion button 523 in turn after the keyboard input screen 52 is displayed and further taps the print icon 513 after the screen is switched over to the main screen 51. On the other hand, in a case where the first printing apparatus 100 is operated to create the label L, on which the character string "ABC" is printed, as described above, a user presses the "A" key, the "B" key, the "C" key, and the print key 115 in turn after the input edition screen 121 is displayed (refer to FIG. 5). In other words, the operability of the terminal device E, in which the software keyboard 522 is selected as a user interface, is different from the operability of the operation panel 101 of the first printing apparatus 100.

Therefore, in a case where the software keyboard 522 is selected as a user interface, it is inconvenient for a user who is familiar with using the operation panel 101 of the first printing apparatus 100 since the terminal device E cannot be operated as the user likes. For example, the user who is familiar with using the operation panel 101 of the first printing apparatus 100 searches the keyboard input screen 52 for the print icon 513 under the assumption that the print icon 513 is displayed on the keyboard input screen 52 with the software keyboard 522. Thus, an operation of an operation panel image 101a (refer to FIG. 14 and FIG. 15), which is an image of the operation panel 101 of the first printing apparatus 100, can be performed in the terminal device E.

When the "new setting" option called up from the menu icon 514 is tapped in a state where the "model A" or the "model B" is selected in the interface selection field 512 (refer to FIG. 10) displayed on the main screen 51, an image input screen 53 is displayed.

Figure 3:
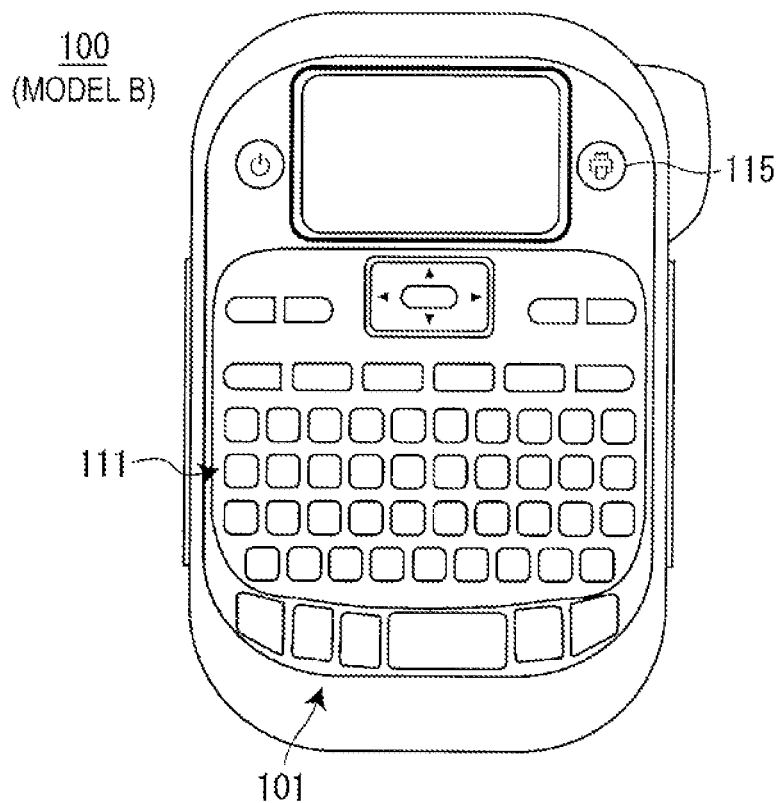
FIG. 3 is a view illustrating a model B of the first printing apparatus.
Figure 14:
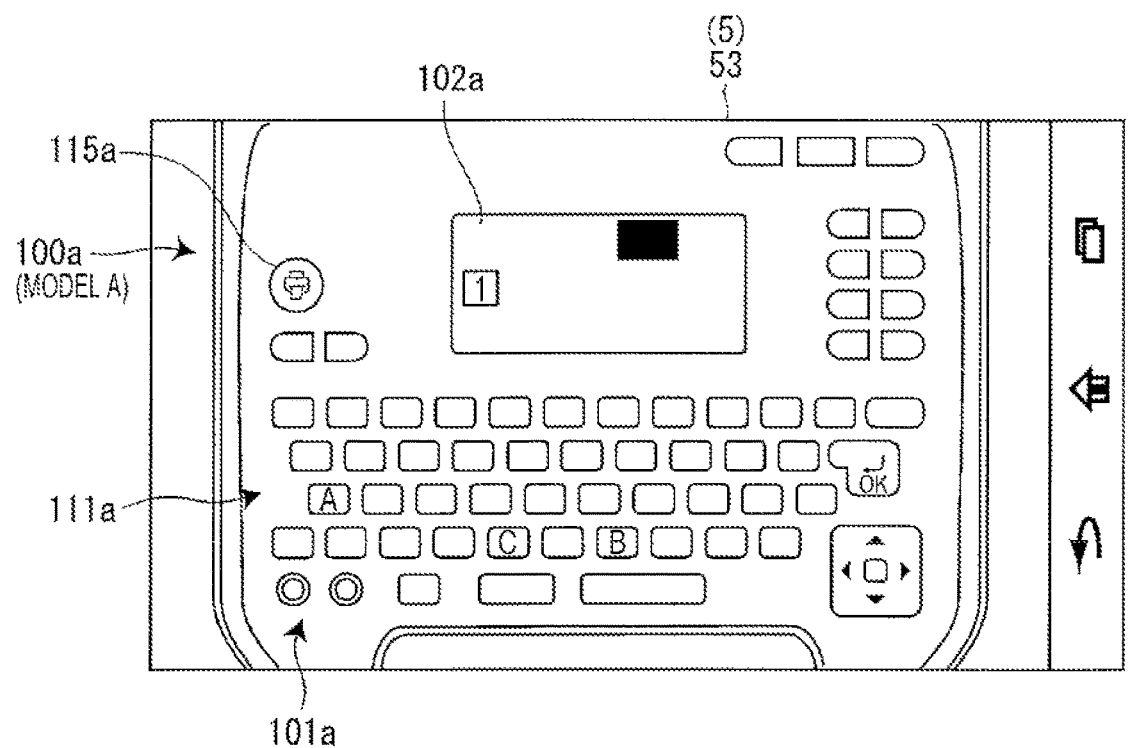
FIG. 14 is a view illustrating an apparatus image of the model A which is displayed on the terminal display.
Figure 15:
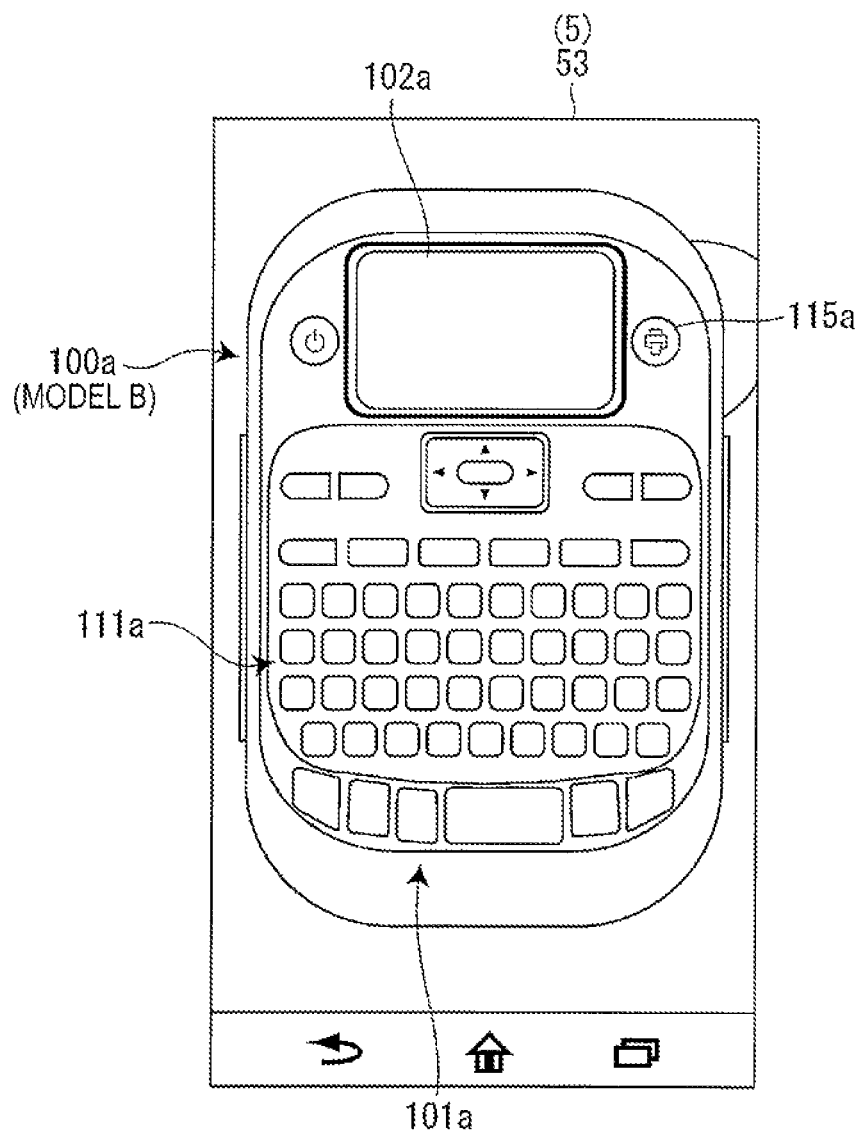
FIG. 15 is a view illustrating an apparatus image of the model B which is displayed on the terminal display.

An apparatus image 100a, which is an image of the first printing apparatus 100, is displayed onto the image input screen 53. In a case where the "model A" is selected in the interface selection field 512, an image of the model A illustrated in FIG. 2 is displayed as the apparatus image 100a as illustrated in FIG. 14. In a case where the "model B" is selected in the interface selection field 512, an image of the model B illustrated in FIG. 3 is displayed as the apparatus image 100a as illustrated in FIG. 15.

The operation panel image 101a and a display image 102a are included in the apparatus image 100a. The operation panel image 101a is an image of the operation panel 101. A letter key group image 111a and a print key image 115a are included in the operation panel image 101a. The letter key group image 111a is an image of the letter key group 111 and receives an operation of inputting a letter. The print key image 115a is an image of the print key 115 and receives an operation of instructing printing execution. The arrangement of an image of each key on the operation panel image 101a of the model A is the same as the arrangement of each key on the operation panel 101 of the model A. Similarly, the arrangement of an image of each key on the operation panel image 101a of the model B is the same as the arrangement of each key on the operation panel 101 of the model B. The display image 102a is an image of the apparatus display 102, and a letter input by an operation of the letter key group image 111a is displayed therein.

Figure 17:
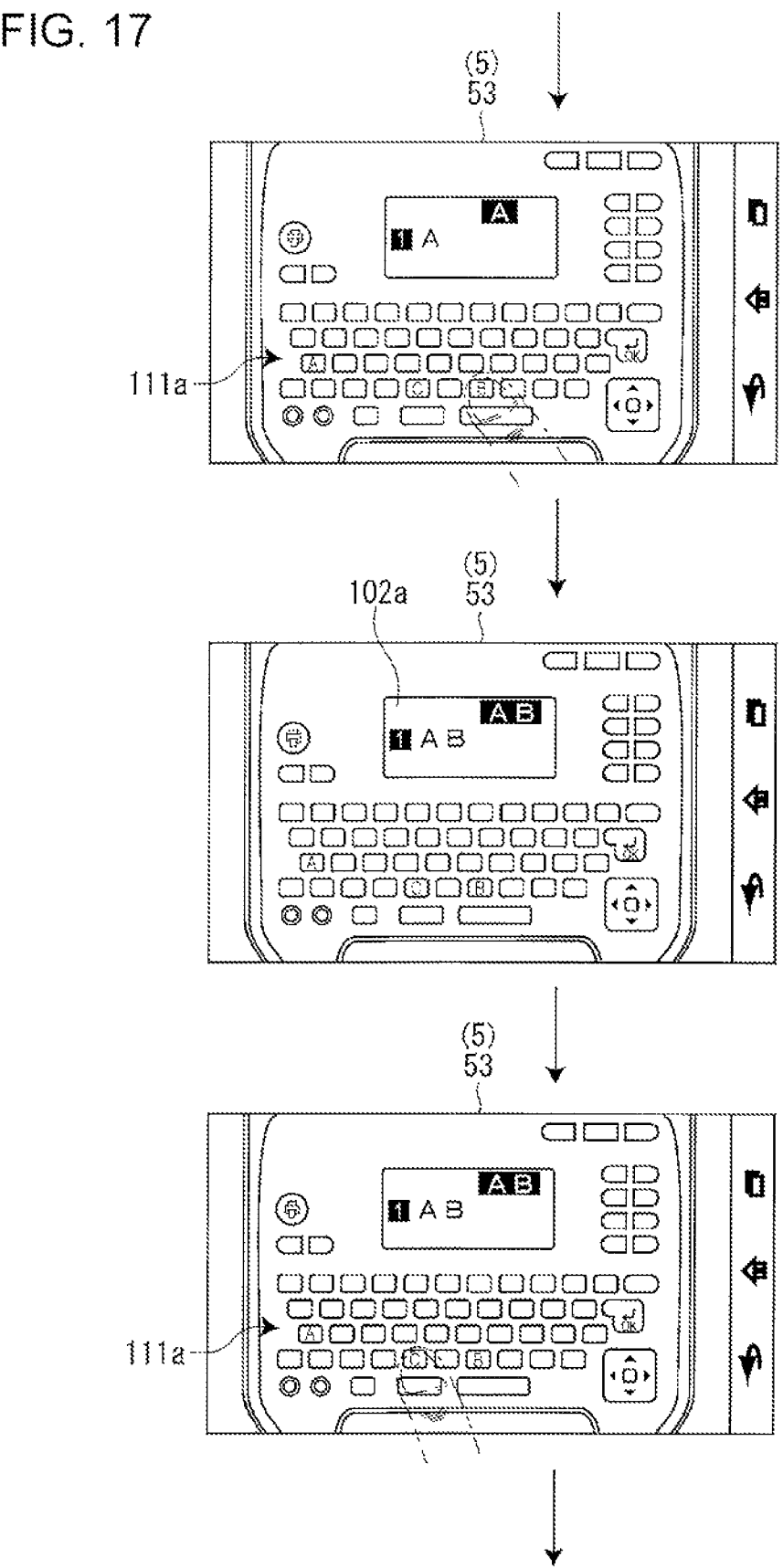
FIG. 17 is a screen transition view following FIG. 16.
Figure 18:
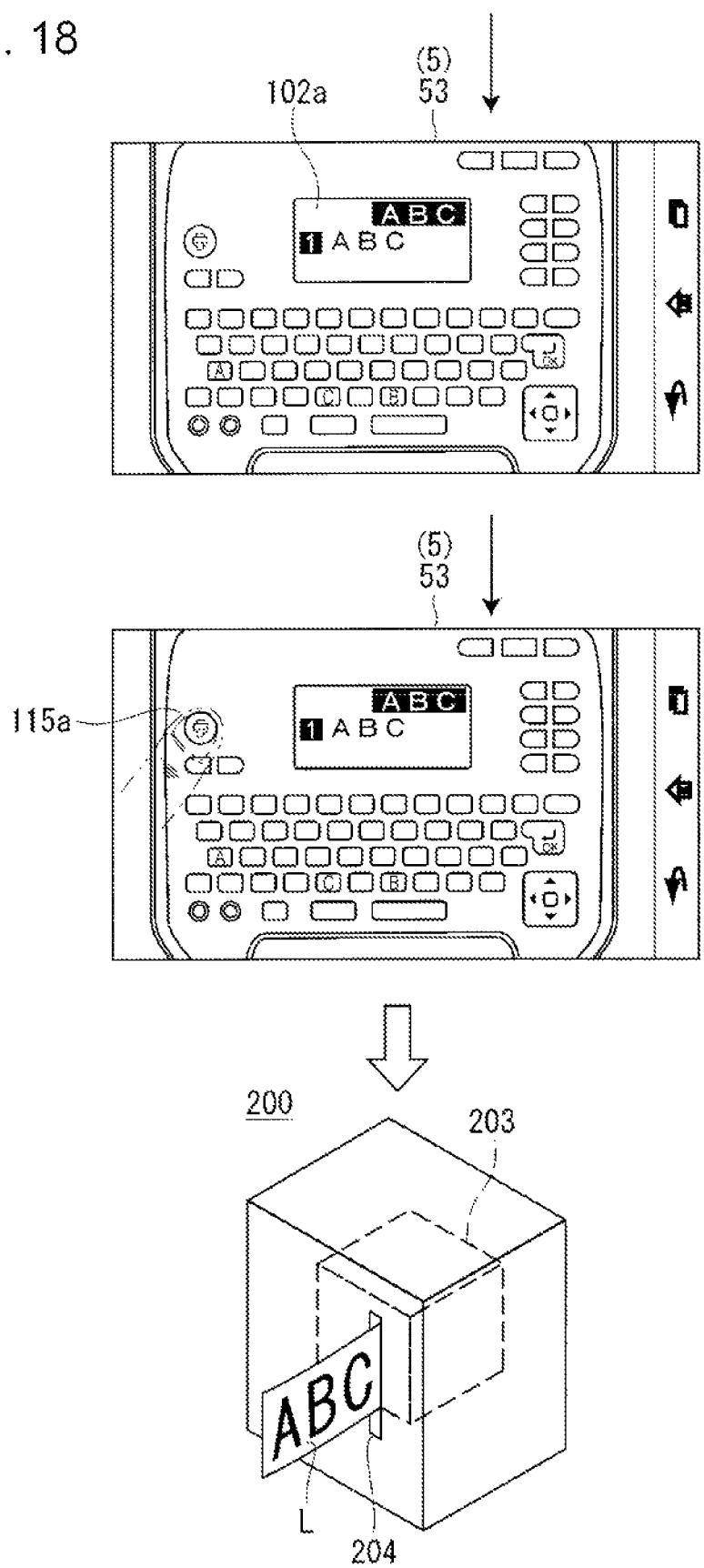
FIG. 18 is a view illustrating screen transition following FIG. 17 and the label printed by the second printing apparatus.

Operation procedures in a case where the terminal device E, in which the operation panel image 101a of the model A is selected as a user interface, is operated to create the label L will be described with reference to FIG. 16 to FIG. 18. The same description to be followed also applies to a case where the operation panel image 101a of the model B is selected as a user interface.

Figure 16:
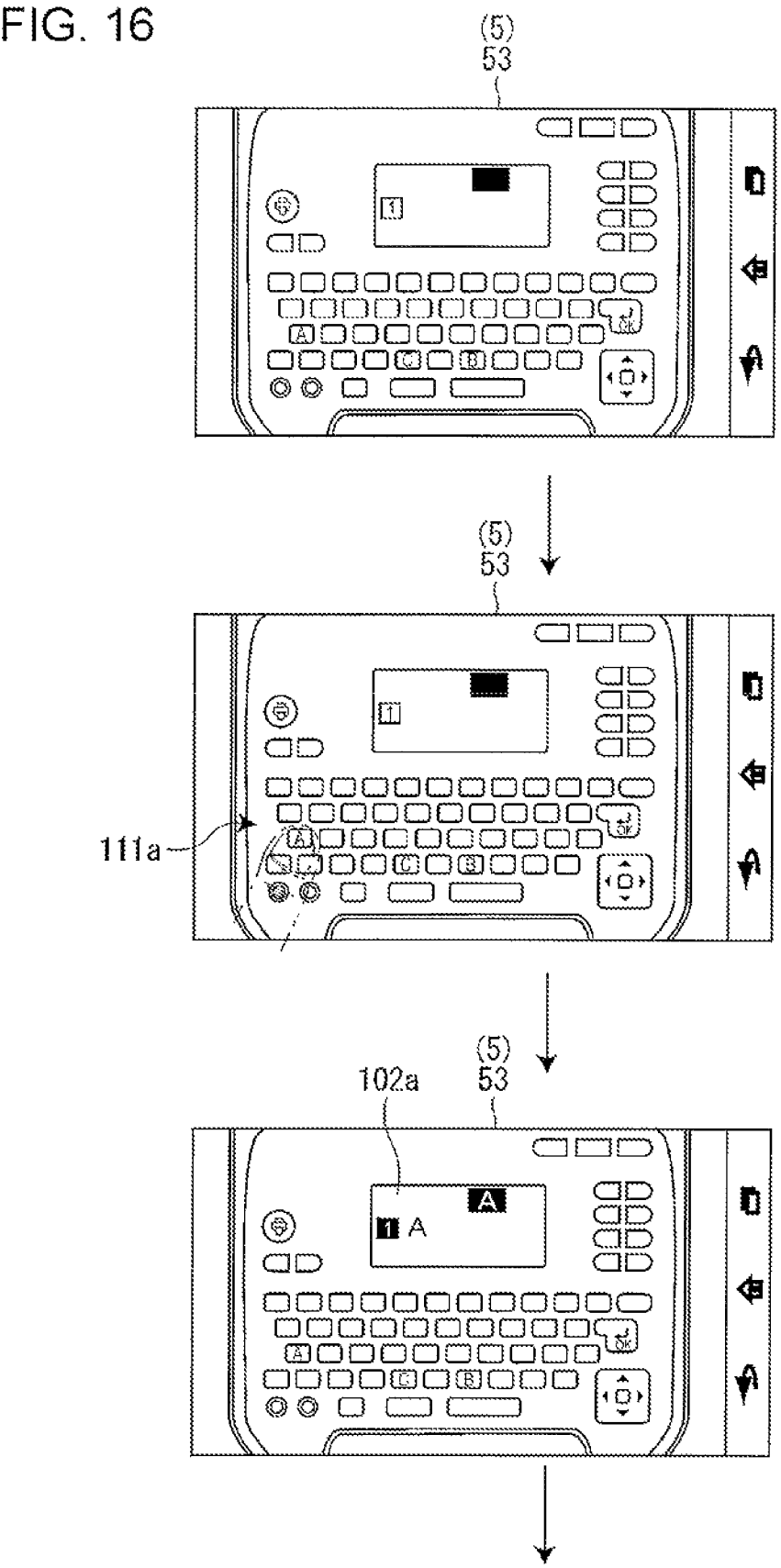
FIG. 16 is a screen transition view when the terminal device, in which an operation panel image of the model A is selected as a user interface, is operated to create the label.

As illustrated in FIG. 16, when the image of the "A" key in the letter key group image 111a is tapped on the image input screen 53, the display image 102a displaying "A" is displayed. Next, as illustrated in FIG. 17, when the image of the "B" key in the letter key group image 111a is tapped, the display image 102a displaying "AB" is displayed. Next, when the image of the "C" key in the letter key group image 111a is tapped, the display image 102a displaying "ABC" is displayed as illustrated in FIG. 18.

Then, when the print key image 115a is tapped on the image input screen 53, the terminal side control unit 4 creates print data based on the letters input by the operations of the letter key group image 111a, and the terminal side communication unit 7 transmits the created print data to the second printing apparatus 200. The second printing apparatus 200 performs automatic cutting after printing is performed on the tape T based on the received print data. Consequently, the label L on which a character string "ABC" is printed is sent out from the tape outlet 204 of the second printing apparatus 200.

As described above, in a case where the terminal device E, in which the operation panel image 101a of the model A is selected as a user interface, is operated to create the label L, on which the character string "ABC" is printed, a user taps the image of the "A" key, the image of the "B" key, the image of the "C" key, and the image of the print key image 115a in turn on the operation panel image 101a of the model A. In other words, the operability of the terminal device E, in which the operation panel image 101a of the model A is selected as a user interface, is the same as the operability of the operation panel 101 of the model A.

For this reason, for example, even in a case where the model A is not at hand, the label L can be obtained insofar the terminal device E is in a hand of a user who is familiar with using the operation panel 101 of the model A by selecting the operation panel image 101a of the model A as a user interface of the terminal device E, as in the case of operating the model A. Similarly, even in a case where the model B is not at hand, the label L can be obtained insofar the terminal device E is in a hand of a user who is familiar with using the operation panel 101 of the model B by selecting the "model B" as a user interface of the terminal device E, as in the case of operating the model B.

The terminal display 5 displays the operation panel image 101a, which is the image of the operation panel 101 of the first printing apparatus 100, in the terminal device E of the embodiment. The first printing apparatus 100 is an apparatus that creates print data by an operation of the operation panel 101. The touch sensor 6 detects an operation of the operation panel image 101a. Then, the terminal side control unit 4 creates print data based on detection of the operation of the operation panel image 101a.

In this configuration, a user can perform an operation of the operation panel image 101a displayed on the terminal display 5 as in the case of performing an operation of the operation panel 101. Then, the terminal side control unit 4 creates print data based on detection of the operation of the operation panel image 101a. Therefore, according to the configuration, a user operates the terminal device E with the same usability as the operation panel 101 of the first printing apparatus 100 and can create print data.

In addition, in the terminal device E of the embodiment, the terminal display 5 displays the model A and the model B such that the models can be selected and thus any model is selected. Then, when displaying the operation panel image 101a, the terminal display 5 displays an image of the operation panel 101 of the selected model as the operation panel image 101a.

In this configuration, a user can select a desired model, for example, a familiar model from the plurality of models. Therefore, according to the configuration, a user can operate the terminal device E with the same usability as the operation panel 101 of the desired model.

Models to be presented as choices may be models having the operation panel 101, or may not have a function of communicating with the terminal device E.

When displaying the operation panel image 101a, the letter key group image 111a, which is the image of the letter key group 111 and receives an operation of inputting a letter, is included in the operation panel image 101a displayed by the terminal display 5 in the terminal device E of the embodiment. When creating print data, the terminal side control unit 4 creates print data based on a letter input by an operation of the letter key group image 111a.

In this configuration, a user can perform an operation of the letter key group image 111a displayed on the terminal display 5 as in the case of performing an operation of the letter key group 111. Then, the terminal side control unit 4 creates print data based on a letter input by the operation of the letter key group image 111a. Therefore, according to the configuration, a user operates the terminal device E with the same usability as the letter key group 111 of the first printing apparatus 100 and can create print data.

In the terminal device E of the embodiment, the terminal display 5 displays the display image 102a, which is the image of the apparatus display 102 and in which a letter input by an operation of the letter key group image 111a is displayed.

According to this configuration, a user can operate the terminal device E while the user checks a letter input by an operation of the letter key group image 111a.

In the terminal device E of the embodiment, the terminal side communication unit 7 transmits created print data to the first printing apparatus 100 or the second printing apparatus 200.

According to this configuration, even in a case where the first printing apparatus 100 is not at hand, printing can be performed by the first printing apparatus 100 or the second printing apparatus 200 by a user operating the terminal device E with the same usability as the letter key group image 111a of the first printing apparatus 100.

The terminal side control unit 4 is an example of a "device function executing unit". The terminal display 5 is an example of a "device display unit". The touch sensor 6 is an example of a "detection unit". The terminal side communication unit 7 is an example of a "data transmission unit". The operation panel 101 is an example of an "operation unit". The operation panel image 101a is an example of an "operation unit image". The apparatus display 102 is an example of an "apparatus display unit". The display image 102a is an example of a "display unit image". The apparatus side control unit 108 is an example of an "apparatus function executing unit". The letter key group 111 is an example of a "letter input unit". The letter key group image 111a is an example of a "letter input unit image".

The invention is not limited to the embodiment described above, and can adopt various configurations without departing from the spirit of the invention. For example, the embodiment can be changed into the following form.

The terminal device E may execute a function other than print data creation by an operation of an operation unit of the apparatus displayed by the terminal display 5. For example, in the case of the terminal device E having a call function, a phone number may be sent by displaying an image of an operation unit (a push-button or a rotary dial) of a telephone onto the terminal display 5 and operating an image of the displayed push-button or an image of the rotary dial. In addition, in the case of the terminal device E having a photographing function, photographing may be executed by the terminal display 5 displaying an image of an operation unit (a shutter and a lens) of a camera and operating an image of the displayed shutter, and focus may be adjusted by an operation of an image of the displayed lens.

CROSS REFERENCE TO RELATED APPLICATION

This application claims priority to Japanese Patent Application No. 2015-180777 filed on Sep. 14, 2015, the entire contents of which are incorporated by reference herein.

The invention claimed is:

1. A function executing method of a device that executes
a step of displaying an operation unit image, which is an image of an operation unit of an apparatus including the operation unit and an apparatus function executing unit that executes a function by an operation of the operation unit, by a device display unit,
a step of detecting an operation of the operation unit image by a detection unit, and
a step of executing the function based on detection of the operation of the operation unit image by a device function executing unit,
wherein the operation unit has a letter input unit that receives an operation of inputting a letter,
the apparatus function executing unit creates print data, as the function, based on the letter input by an operation of the letter input unit,
the apparatus further includes a printing unit that performs printing based on the print data,
in the step of displaying the operation unit image, a letter input unit image, which is an image of the letter input unit and receives the operation of inputting a letter, is included in the operation unit image displayed by the device display unit, and
in the step of executing the function, the device function executing unit creates the print data, as the function, based on the letter input by an operation of the letter input unit image.

2. The function executing method of a device according to claim 1,
wherein the apparatus further includes an apparatus display unit that displays the letter input by the operation of the letter input unit, and
the device further executes a step of displaying a display unit image, which is an image of the apparatus display unit and in which the letter input by the operation of the letter input unit image is displayed, by the device display unit.

3. The function executing method of a device according to claim 1,
wherein the device further executes a step of transmitting the print data created in the step of executing the function to the apparatus that performs printing based on the received print data or to another apparatus that performs printing based on the received print data without having the function of creating the print data, by a data transmission unit.

* * * * *